June 7, 1960   J. D. BOTTJE ET AL   2,939,431
LOAD BALANCING DEVICE
Filed April 4, 1957   4 Sheets-Sheet 1
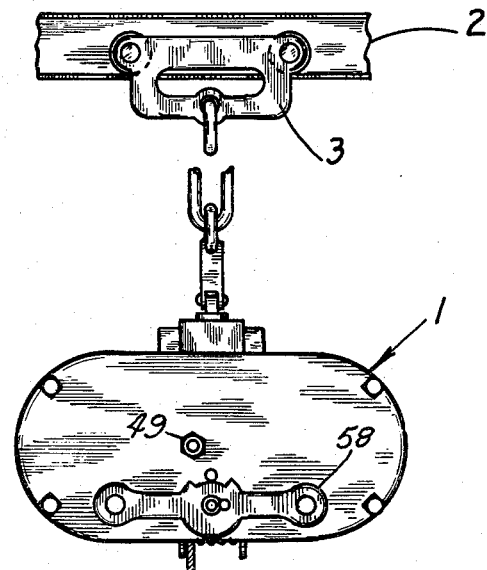
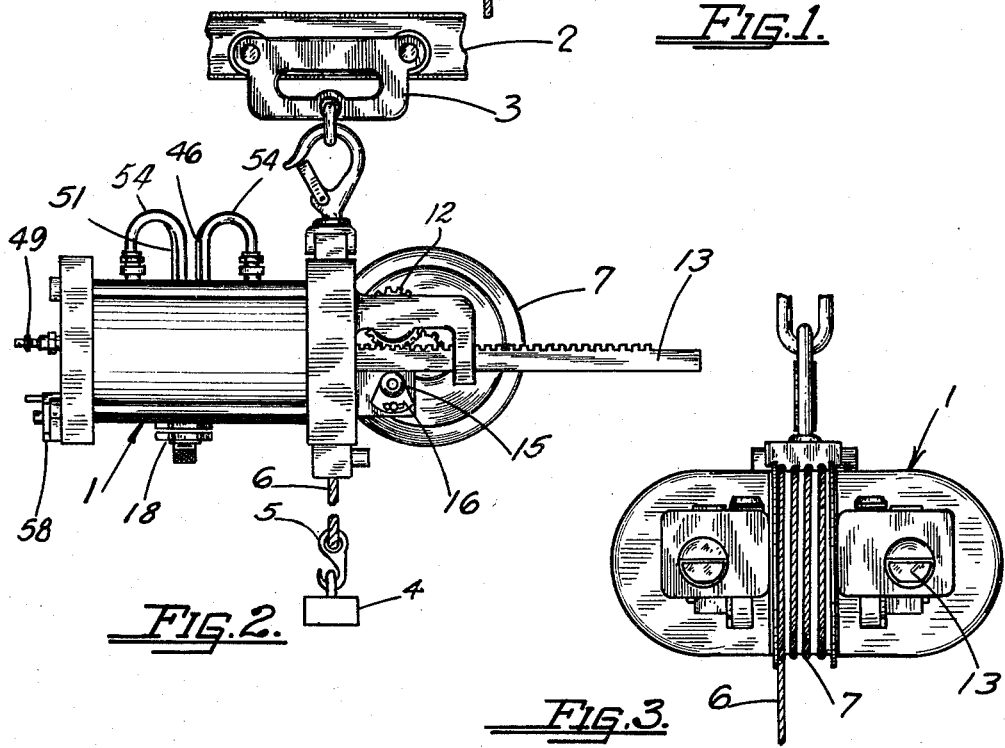
INVENTORS
JOHN D. BOTTJE
ROBERT B. SHULTERS
BY Charles W. Walton
ATTORNEY June 7, 1960   J. D. BOTTJE ET AL   2,939,431
LOAD BALANCING DEVICE Filed April 4, 1957   4 Sheets-Sheet 3

INVENTORS
JOHN D. BOTTJE
ROBERT B. SHULTERS
By Charles W. Walton
ATTORNEY

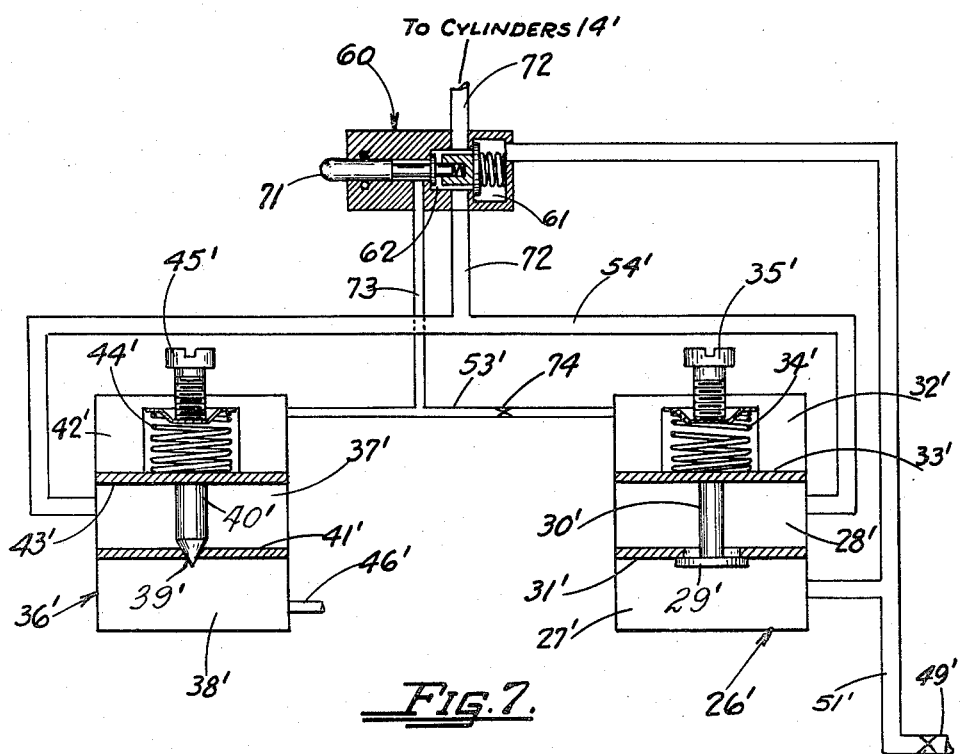
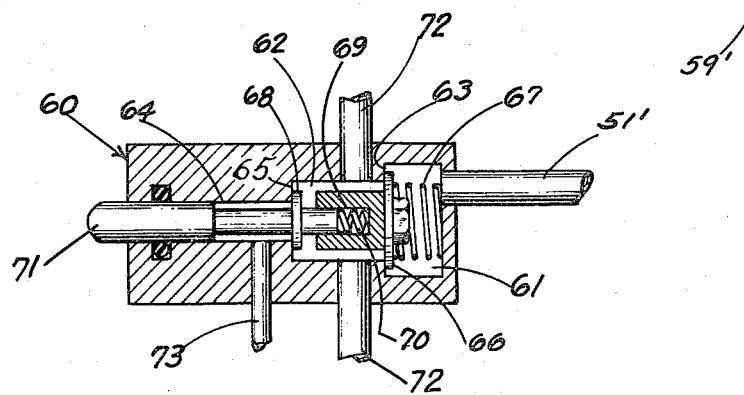

United States Patent Office 2,939,431
Patented June 7, 1960

2,939,431

LOAD BALANCING DEVICE

John D. Bottje, Grand Haven, and Robert B. Shulters, Spring Lake, Mich., assignors to Gardner-Denver Company, Quincy, Ill., a corporation of Delaware Filed Apr. 4, 1957, Ser. No. 650,696

4 Claims. (Cl. 121—46)

This invention relates to load balancers which are used to counterbalance or neutralize the weight of a load suspended therefrom and are so constructed that application of a lifting or lowering force equal to a mere fraction of the weight of the load will elevate or lower the load within the range of the load balancer. Load balancers have many practical applications in industry such as supporting a heavy tool which must be positioned and repositioned to its work. Load balancers may also be used in combination with a hoist so that a load may be lifted by the hoist over the bed of a machine tool and then upon utilizing the balancer the load may be manually positioned over the machine bed, between centers, etc.

Previous load balancers have been cumbersome devices often having a cable carried by a pair of pulleys, one pulley being fixed to a support member, the other pulley carried on an extensible cylinder.

Accordingly, it is an object of this invention to provide a load balancing device of a novel design and at the same time to provide a compact operative unit.

It is a further object of this invention to eliminate the extensible pulley structures heretofore employed substituting rack and gear elements therefor.

Further objects and purposes of this invention will become apparent upon reading the following specification and drawings.

In the drawings:

Fig. 1 is an end elevation of a load balancing device in accordance with one aspect of this invention.

Fig. 2 is a side elevation of the load balancer shown in Fig. 1.

Fig. 3 is an end elevation of the load balancing device as seen from the end opposite to that shown in Fig. 1.

Fig. 7 is a view similar to that of Fig. 6 diagrammatically representing a pneumatic control circuit with an automatic valve.

Fig. 8 is an enlarged sectional view of the automatic valve illustrated in Fig. 7.

Figure 4:
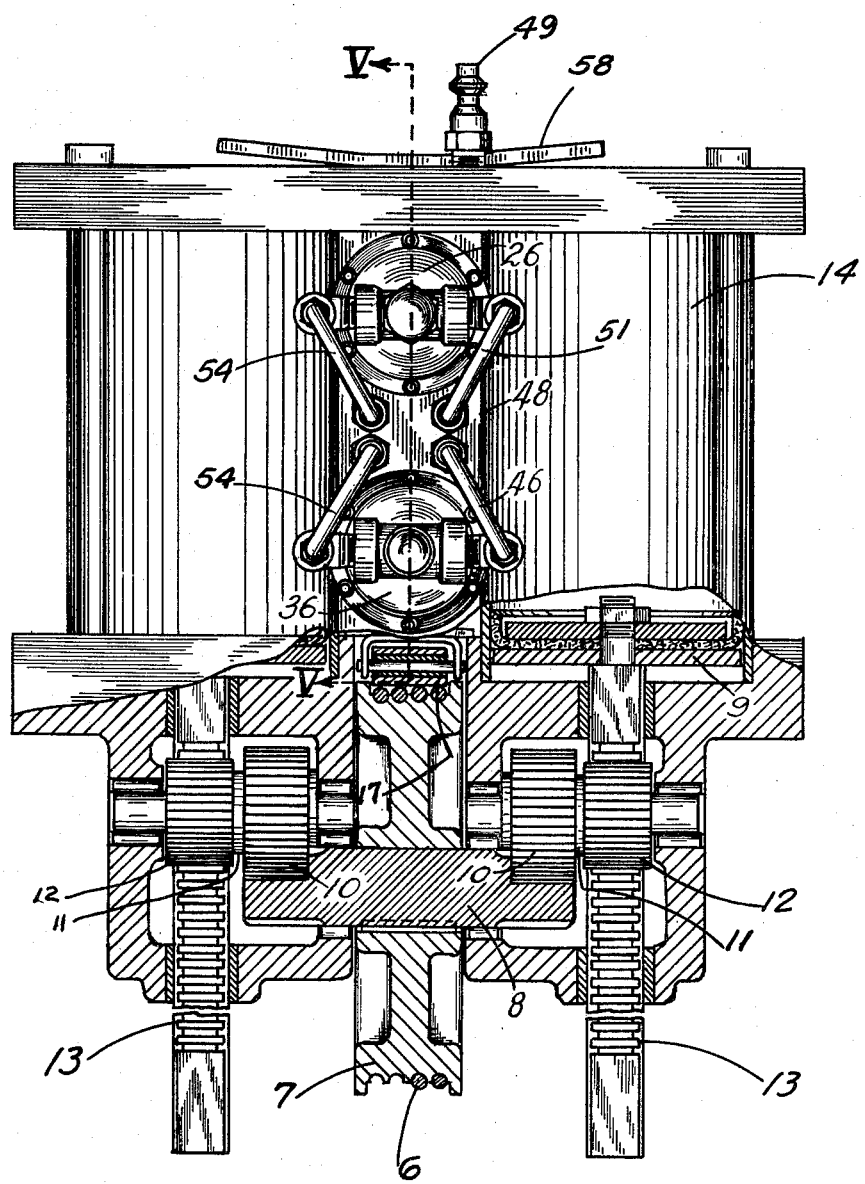
Fig. 4 is a top plan view partially in section of the device of Figs. 1–3.

Referring specifically to the drawings, Figs. 1–4 show a load balancing device generally indicated as 1 which is suspended from an overhead support 2 on a movable trolley 3. A load 4 is shown suspended from the load balancer on a hook 5 fixed to a cable 6.

Fig. 4 shows that within the load balancer, the cable 6 is wrapped about a pulley or drum 7 having spiral grooves about its periphery. The pulley is keyed to and rotatable with a spindle 8 which operatively connects the pulley to a pair of pistons 9. The spindle 8 has gear teeth at each of its ends which engage a pair of drive gears 10. The drive gears 10 are keyed to and rotatable with a pair of shafts 11 to which pinion gears 12 are also keyed.

Pinion gears 12 engage teeth on a pair of racks, the racks being cut on a pair of piston rods 13. Each of the piston rods 13 carries a piston 9 at one end thereof. The pistons 9 are movable longitudinally within a pair of single acting cylinders 14. Adjustable cam followers (Fig. 2), each comprising a rotatable bearing 15 on an eccentric 16, hold the racks 13 in engagement with pinion gears 12 to substantially reduce any frictional drag during reciprocation of the piston. A roller 17 engages the cable 6 on the pulley 7 to retain the cable in the spiral grooves of the pulley. By this structure, the amount of lifting force exerted by the device on the load 4 is proportional to the pressure within the cylinders 14. With a gear ratio of eight to one, the load 4 will be counterbalanced when the force on the pistons 9 is eight times the weight of the load.

Further, with an 8:1 gear ratio, the range of lineal motion of the cable 6 is eight times the stroke of the pistons 9 within the cylinders 14. The structure disclosed herein refers to a unit having a specific ratio of movement between the pistons 9 and the cable 6 but it is obvious that this ratio may be changed by changing the gear elements heretofore described.

Figure 5:
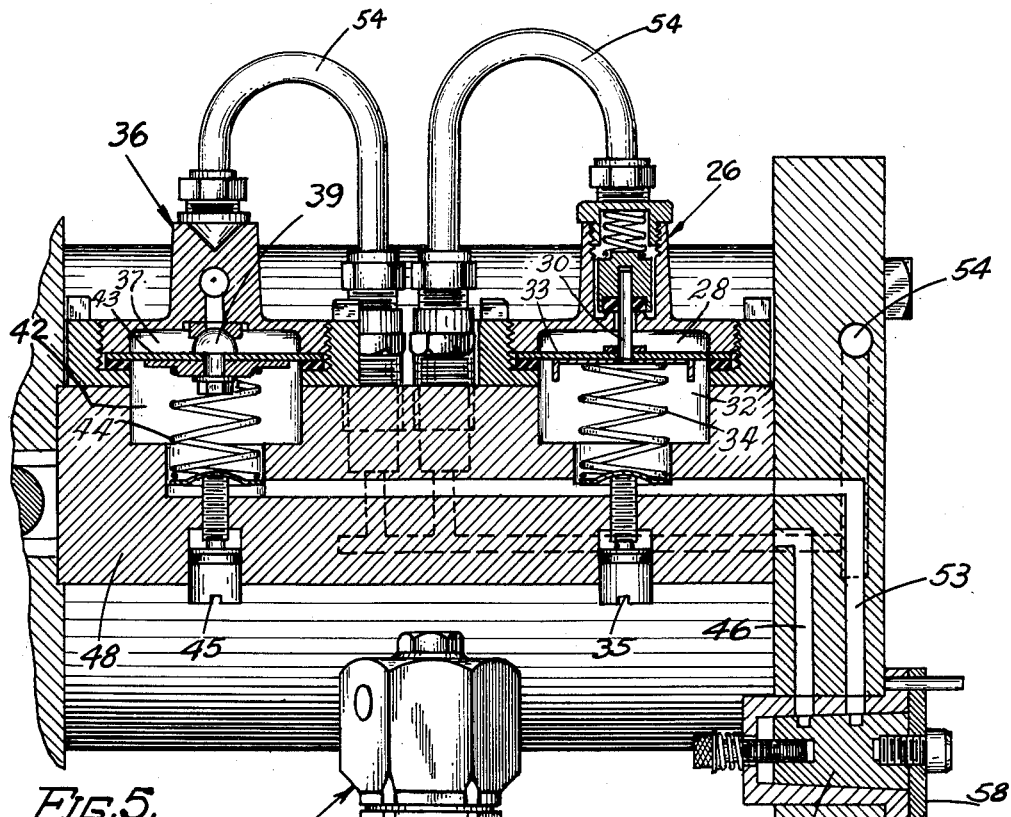
Fig. 5 is a partial sectional view along the line V—V of Fig. 4.
Figure 6:
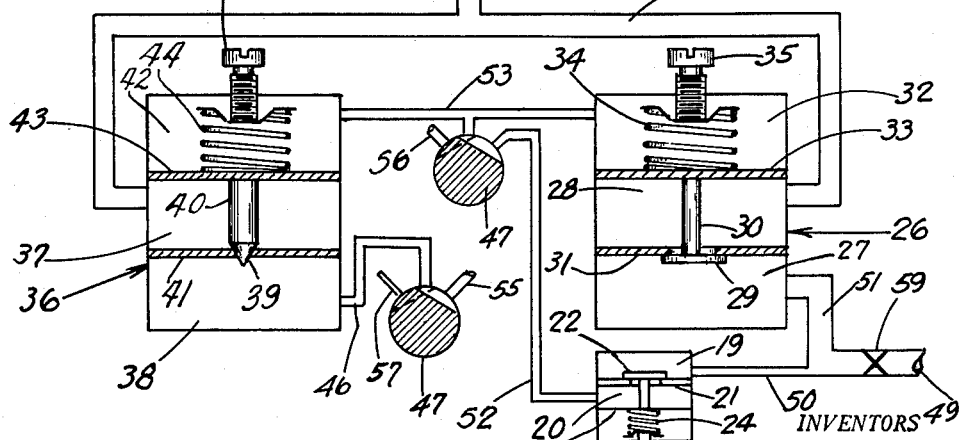
Fig. 6 is a diagrammatic representation of the pneumatic control circuit of the load balancer illustrated in Figs. 1–5.

Pressure fluid, such as air, is admitted to, or withdrawn from the cylinders 14 by means of an air circuit diagrammatically represented in Fig. 6 and consisting of four main elements with interconnecting air passages and valves. A pressure regulator 18 (Figs. 5 and 6) has an inlet chamber 19, an outlet chamber 20, an apertured wall 21 between said chambers, a valve 22 in said aperture connected to a diaphragm 23 for controlling movement of valve 22, and a spring 24 which is adjustable by a knurled screw 25. A low pressure controller 26 has a valve chamber including an inlet chamber 27, an outlet chamber 28, a valve 29 on a valve stem 30 between said chambers for controlling the flow of air through an opening in a wall 31 separating the chambers 27 and 28, a control chamber 32 with a diaphram 33 separating the control chamber 32 and the outlet chamber 28 for controlling movement of valve stem 30, and a spring 34 adjustable by a screw 35.

A high pressure controller 36 has a valve chamber including an inlet chamber 37, an outlet chamber 38, a needle type valve 39 on a valve stem 40 between said chambers for controlling the flow of air through an opening a wall 41 separating the two chambers 37 and 38, a control chamber 42 with a diaphragm 43 separating the control chamber 42 and the inlet chamber 37 for controlling movement of valve stem 40, and a spring 44 adjustable by a screw 45.

Outlet chamber 38 of controller 36 is vented to atmosphere through a passage 46 and a control valve 47.

The control valve 47 has two sections, axially spaced from each other as illustrated in Figs. 5 and 6 for controlling the operation of the load balancing device. The pressure regulator 18 and controllers 26 and 36, diagrammatically represented in Fig. 6, are commercially available from several manufacturers and of themselves contain no elements of novelty. However, standard elements may be incorporated in a housing 48 mounted between the cylinders 14 as illustrated in Figs. 4 and 5.

To initially balance a load supported by the load balancer, air, from a source not shown, enters the system at 49 (Fig. 6) where a passage 50 conducts the air to the inlet chamber 19 of pressure regulator 18. Another passage 51 conducts air to the inlet chamber 27 of controller 26. Air regulated to the pressure to which regulator 18 has been manually adjusted by screw 25 is conducted from the outlet chamber 20 through a passage 52 to one section of control valve 47 and thence through a passage 53 to control chambers 32 and 42 of controllers 26 and 36 respectively. By manual adjustment of the screw 25 of pressure regulator 18, the pressure necessary to exactly balance a load on the cable of the balancer is admitted to control chambers 32 and 42.

Air pressure in control chamber 32 of controller 26 depresses the diaphragm 33 and valve stem 30 to open valve 29 admitting air at line pressure into outlet chamber 28 and a passage 54 interconnecting outlet chamber 28 with air cylinders 14 and inlet chamber 37 of controller 36. When the air pressure in outlet chamber 28 of controller 26 balances the pressure in control chamber 32 thereof, valve 29 will close and the cylinders 14 and the various chambers of controllers 26 and 36 will be in balance.

Once the air system is in balance to suspend a load, the load may be moved up and down by merely overcoming the friction of the balancing device. When the load is raised, the pistons 9 move away from the ends of the cylinders 14 enlarging the volume and reducing the pressure therein. This results in a reduction of the pressure in outlet chamber 28 of controller 26. The control pressure in control chamber 32 of controller 26, which is maintained constant by the pressure regulator 18, then forces diaphragm 33 and valve stem 30 downward to open the valve 29 to admit additional air pressure to outlet chamber 28 and cylinders 14 until the balance between the control and outlet chambers of controller 26 is restored and valve 29 closes. At the same time, pressure in the inlet chamber 37 of controller 36 has decreased but the pressure in control chamber 42 tending to move diaphragm 43 and valve stem 40 downward only serves to hold valve 39 closed more firmly.

When the load is lowered, the pistons 9 move toward the ends of the cylinders 14 decreasing the volume and increasing the pressure therein. This results in an increase in the pressure in inlet chamber 37 of controller 36. The pressure in control chamber 42 of the controller is overcome forcing diaphragm 43 and valve stem 40 upwardly to open the valve 39, bleeding air from inlet chamber 37 through outlet chamber 38, passage 46 and control valve 47 to atmosphere through a passage 55 until the balance between the control and inlet chambers of controller 36 is restored and valve 39 closes. At the same time pressure in the outlet chamber 28 of controller 26 is increased but the pressure tending to move diaphragm 33 and valve stem 30 upward only serves to hold valve 29 closed more firmly.

To reduce the pressures in the system, control valve 47 is rotated to the position shown by the dotted lines in Fig. 6 which bleeds air from control chambers 32 and 42 to atmosphere through a passage 56. This causes diaphragm 43 and valve stem 40 in controller 36 to move upward opening the valve 39. Air pressure in cylinders 14, outlet chamber 28 of controller 26 and inlet chamber 37 of controller 36 is relieved through passage 46 and valve 47 through a narrow passage 57 to atmosphere. The narrow passage 57 restricts the flow of air to prevent a load supported by the balancer from dropping too rapidly. The control valve 47 is operated by a handle 58 (Figs. 1 and 4).

The springs 34 and 44 in controllers 26 and 36 respectively may be adjusted by screws 35 and 45 to balance the weight of the cable 6 and hook 5 or a load supporting cradle from which a load is suspended. This adjustment is made with no air pressure in control chambers 32 and 42 and with no load on the hook 5.

A check valve 59 is shown in the air supply line 49 to prevent air from escaping from the system in the event the air supply is cut-off due to an accident or inadvertence.

Figure 7 diagrammatically represents a variation in the control system shown in Fig. 6, wherein the manually adjustable pressure regulator 18 and control valve 47 disclosed therein are eliminated, and replaced by a valve 60 shown in detail in Fig. 8.

The valve 60 comprises a housing having two chambers 61 and 62 forming a seat 63 therebetween. A passage 64 communicating with chamber 62 provides a second seat 65 therebetween. Movable within the chambers 61 and 62 is a valve member 66 normally held against seat 63 in closed position by a spring 67 preventing communication between the chambers. A second valve element 68 is received in a recess 69 in the valve member 66. A spring 70 in the recess serves to normally hold valve element 68 in closed position against seat 65 whereby to prevent communication between chamber 62 and passage 64. A valve stem 71 of valve element 68 projects from the valve housing 60 and may be manually depressed to unseat the two valve elements 66 and 68. Chamber 62 is in continuous communication with passages 72 which interconnect the cylinders 14' and passage 54' leading to outlet chamber 28' of low pressure controller 26' and inlet chamber 37' of high pressure controller 36'. Passage 64 of the valve 60 connects the valve through a passage 73 leading to line 53' interconnecting the control chambers 32' and 42', of controllers 26' and 36' respectively.

In operation of a balancer utilizing the control of Fig. 7, the valve stem 71 in valve 60 is manually depressed admitting air pressure from line 51' through the open valve elements 66 and 68 and passage 73 to passage 53' thence to control chambers 32' and 42'. Air at line pressure is also admitted to cylinders 14' through passages 72 of the valve, to passage 54' and thence to inlet chamber 37' and outlet chamber 28'. As soon as a load supported by the balancer starts to move, the valve stem 71 is released locking the air pressure necessary to balance the load in the control part of the circuit yet permitting the communication through said valve of the pressures in cylinders 14', outlet chamber 28' and inlet chamber 37'. Thereafter operation is identical to that described above when the load is raised or lowered. A manual poppet valve 74 is added to bleed the air from control chambers 32' and 42' to cause valve 39' to open when it is desired to release the pressure in the cylinders 14', outlet chamber 28' and inlet chamber 37' to atmosphere through port 46'. It will be apparent that the valve 60 provides means for automatically sensing the weight of a load to be balanced admitting to the control chambers 32' and 42' the pressure necessary to counterbalance any load within the operating range of the balancer.

The load balancing device hereinbefore described may be readily adapted for use with a pneumatic hoist and such an adaptation is more specifically described and claimed in a separate application, Serial No. 650,695, filed by the same inventors concurrently with this application and entitled Load Balancer for Hoists which has since matured into Patent No. 2,901,219.

It will be apparent to one skilled in the art of balancing devices and pneumatic controls that other pressure fluid actuated means may be substituted for the cylinder and piston arrangement described herein and that the structure and circuits herein described lend themselves to additional variations which will fall within the scope of the invention claimed hereafter.

In the following claims the word "cable" has been used for convenience but it is intended as a term generic to a flexible tension member of any well-known type.

We claim as our invention:

1. In a load balancer comprising a cylinder having a reciprocable piston therein and load supporting means connected to said piston: a fluid pressure system connected to one side of said cylinder, a low pressure controller and a high pressure controller, each of said controllers having a control chamber and a valve chamber, said valve chambers being in communication with each other and with said system, a pressure regulator, said control chambers being in communication with each other and with a source of pressure fluid through said pressure regulator, and said controllers being adapted to admit pressure fluid to said system from a source of pressure fluid and to exhaust pressure fluid therefrom to maintain pressure fluid active upon said piston at a pressure which will counterbalance a load supported by said load supporting means.

2. In a load balancer comprising a cylinder having a reciprocable piston therein and load supporting means connected to said piston: a fluid pressure system connected to one side of said cylinder, a low pressure controller and a high pressure controller, each of said controllers having a control chamber and a valve chamber, said valve chambers being in communication with each other and with said system, a pressure regulator, said control chambers being in communication with each other and with a source of pressure fluid through said pressure regulator, said controllers being adapted to admit pressure fluid to said system from a source of pressure fluid and to exhaust pressure fluid therefrom to maintain pressure fluid active upon said piston at a pressure which will counterbalance a load supported by said load supporting means; and valve means operable to vent the pressure in said control chambers to atmosphere.

3. In a load balancer comprising a cylinder having a reciprocable piston therein and load supporting means connected to said piston: a fluid pressure system connected to one side of said cylinder, a low pressure controller and a high pressure controller, each of said controllers having a control chamber and a valve chamber, said valve chambers being in communication with each other and with said system, a fluid pressure regulator, said control chambers being in communication with each other and with a source of pressure fluid through said pressure regulator, said controllers being adapted to admit pressure fluid to said system from a source of pressure fluid and to exhaust pressure fluid therefrom to maintain pressure fluid active upon said piston at a pressure which will counterbalance a load supported by said load supporting means; and said fluid pressure regulator being adjustable to regulate the pressure of fluid in said control chambers.

4. In a load balancer comprising a pressure fluid responsive element and load supporting means connected thereto: a fluid pressure system providing pressure fluid active against said element, a low pressure controller and a high pressure controller, each of said controllers having a control chamber and a valve chamber, said valve chambers being in communication with each other and with said system, a pressure regulator, said control chambers being in communication with each other and with a source of pressure fluid through said pressure regulator, said controllers being adapted to admit pressure fluid to said system and to exhaust pressure fluid therefrom to maintain pressure fluid active upon said element at a pressure which will counterbalance a load supported by said load supporting means.

References Cited in the file of this patent

UNITED STATES PATENTS

| | | |
|---|---|---|
| 1,892,829 | Choate | Jan. 3, 1933 |
| 2,176,979 | Platz | Oct. 24, 1939 |
| 2,384,774 | Smallpeice | Sept. 11, 1945 |
| 2,613,903 | Platz | Oct. 14, 1952 |